United States Patent
Sakata et al.

(10) Patent No.: US 6,891,783 B2
(45) Date of Patent: May 10, 2005

(54) INFORMATION RECORDING/ REPRODUCING APPARATUS INCLUDING A RECORDING CONTROLLER WHICH OPERATES BASED ON PREPIT DETECTION

(75) Inventors: Haruyasu Sakata, Tokorozawa (JP); Mitsuru Yoshida, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 474 days.

(21) Appl. No.: 10/043,259

(22) Filed: Jan. 14, 2002

(65) Prior Publication Data

US 2002/0097647 A1 Jul. 25, 2002

(30) Foreign Application Priority Data

Jan. 15, 2001 (JP) ........................................ 2001-006971

(51) Int. Cl.[7] .............................................. G11B 5/09
(52) U.S. Cl. ................. 369/47.14; 369/47.28; 369/53.15; 369/53.34
(58) Field of Search ................. 369/47.14, 47.23, 369/47.24, 47.28, 53.12, 53.13, 53.14, 53.15, 53.31, 53.34, 53.37, 47.31, 53.16, 124.07, 124.08

(56) References Cited

U.S. PATENT DOCUMENTS 5,553,042 A 9/1996 Usui

FOREIGN PATENT DOCUMENTS

| EP | 0 911 830 | 4/1999 |
| EP | 1 017 058 | 7/2000 |

*Primary Examiner*—Paul W. Huber
(74) *Attorney, Agent, or Firm*—Morgan, Lewis & Bockius LLP

(57) ABSTRACT

An information recording/reproducing apparatus which is capable of recording information data even if prepits cannot be correctly read from a recording medium. Prepits are detected from a read signal retrieved from a recording medium to generate a prepit detection signal, and a block signal indicative of a recording timing is generated based on the prepit detection signal. In this event, when the prepit detection signal is normal, an information signal is recorded on the recording medium at a recording timing in accordance with the block signal. On the other hand, when the prepit detection signal is defective, the information signal is recorded on the recording medium at a recording timing in accordance with an auxiliary block signal having the same period as a block length, and a fixed phase.

5 Claims, 7 Drawing Sheets

INFORMATION RECORDING/ REPRODUCING APPARATUS INCLUDING A RECORDING CONTROLLER WHICH OPERATES BASED ON PREPIT DETECTION

BACKGROUND OF THE INVENTION

1. Field of the Invention

The present invention relates to an information recording/reproducing apparatus for recording and reproducing information data on and from a recording medium.

2. Description of Related Art

At present, CD-R, CD-RW, DVD-R, DVD-RW, DVD-RAM and the like are known as optical recording discs on which information data can be written. Further, disc recorders for writing information data on such recording discs have been commercially available.

FIG. 1 is a diagram generally showing areas which comprise a DVD-RW as a recording disc.

As shown in FIG. 1, the DVD-RW has a data structure comprised, from the inner periphery to the outer periphery of the disc, of PCA (Power Calibration Area), RMA (Recording Management Area), a lead-in area, data, and a lead-out area. PCA is an area for attempting a write for determining the recording power for a laser beam. RMA is an area into which management information related to recording is written. The lead-in area is partially formed with an emboss portion. The emboss portion includes phase pits previously formed on the disc, and information related to copy protection and the like may be recorded in the emboss portion.

FIG. 2 is a diagram showing a portion of a recording surface of the recording disc.

As shown in FIG. 2, a disc substrate 101 is spirally or concentrically formed with convex groove tracks 103, which are to be formed with information pits Pt that carry information data, and concave land tracks 102. The groove tracks 103 and land tracks 102 are alternately formed. Further, between mutually adjacent groove tracks 103, a plurality of LPPs (land prepits) 104 are formed. The LPPs 104 are previously provided on the land tracks 102 for knowing a recording timing and an address when a disc recorder records information data.

For recording information data in an unrecorded region AN, in which no information pits Pt have been formed, as shown in FIG. 2, the disc recorder first reads the LPPs 104 from the recording disc to recognize an address on the recording disc. Then, the disc recorder forms information pits Pt which carry information data on the groove tracks 103, corresponding to the recognized address.

However, troubles as follows are experienced when information data is recorded on an unrecorded track adjacent to a recorded region.

Specifically, when a recorded region exists outside a recording track on which information data is to be recorded, the disc recorder may sometimes fail to correctly read the LPPs 104 existing between a recorded region $A_R$ and an unrecorded region $A_N$ due to the influence of information pits Pt formed on the groove track 103 indicated by an outlined arrow in FIG. 2. In this event, the disc recorder cannot identify a recording start timing on the recording disc, resulting in a trouble which involves the inability of the disc recorder to record information data on the grove track 103 indicated by a solid black arrow. Further, a similar problem arises in the emboss portion or PCA as well that the LPPs 104 are incorrectly read so that the disc recorder cannot record in these areas.

Unlike the foregoing case, the disc recorder may experience difficulties in reading LPPs 104 at particular locations on some discs due to the influence of variations in quality, in which case the LPPs 104 are incorrectly read so that the disc recorder fails to record on the disc.

OBJECT AND SUMMARY OF THE INVENTION

The present invention has been made to solve the problems mentioned above, and it is an object of the invention to provide an information recording/reproducing apparatus which is capable of recording information data even if the apparatus experiences difficulties in correctly reading land prepits.

An information recording/reproducing apparatus according to the present invention is configured to record an information signal in units of predetermined block length on a recording medium which has previously been formed with prepits associated with recording timings. The information recording/reproducing apparatus includes a reader for reading recorded information from the recording medium to generate a read signal, a prepit detector for detecting the prepits from the read signal to generate a prepit detection signal, a recording timing signal detector for detecting a block signal indicative of a recording timing for the information signal based on the prepit detection signal, an auxiliary recording timing signal generator for generating a pulse signal having the same period as the block length, and outputting the pulse signal as an auxiliary block signal, and a recording controller for recording the information signal on the recording medium at a recording timing in accordance with the block signal when the prepit detection signal is normal, and for recording the information signal on the recording medium at a recording timing in accordance with the auxiliary block signal when the prepit detection signal is defective.

DETAILED DESCRIPTION OF THE EMBODIMENTS

Figure 3:
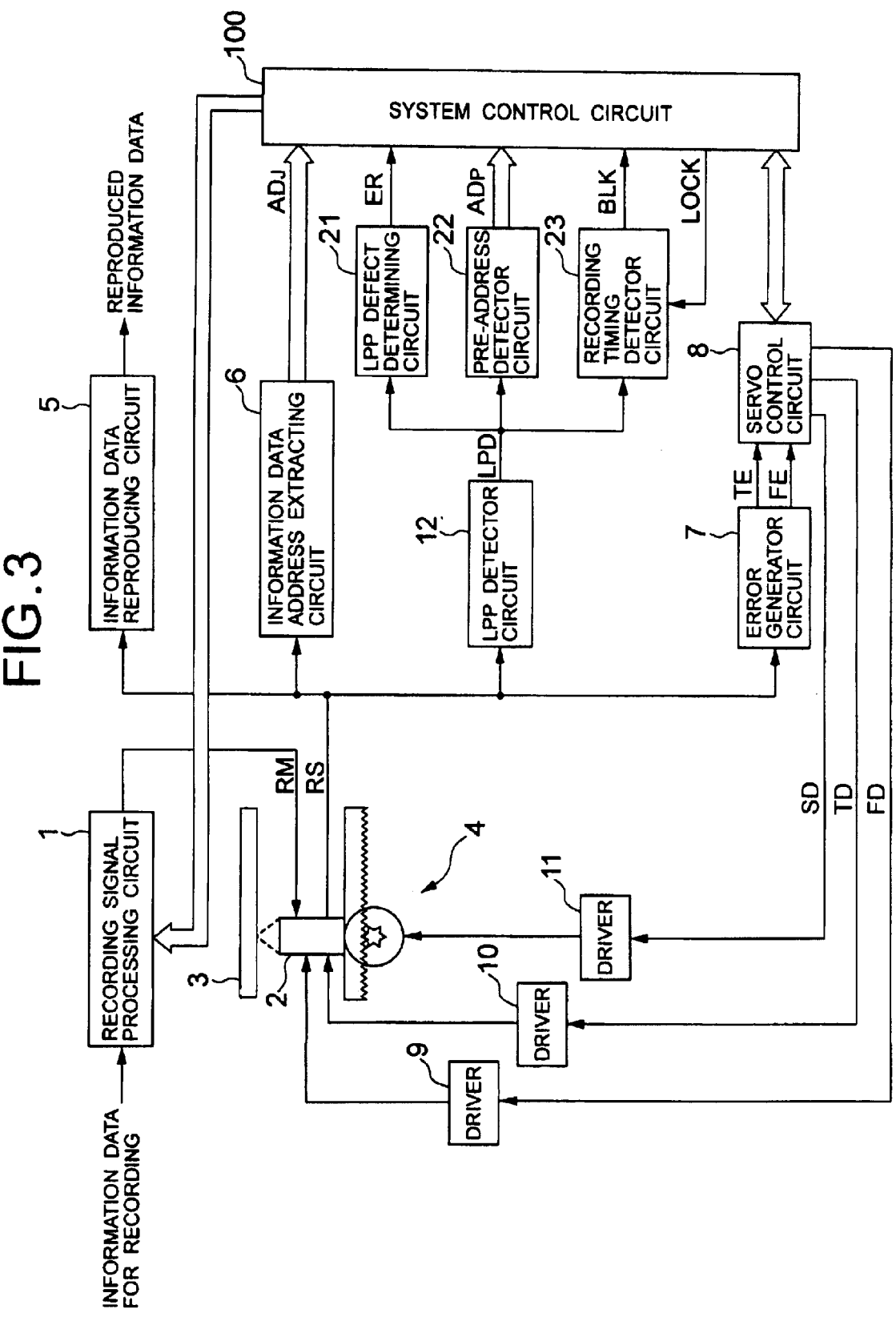
FIG. 3 is a block diagram illustrating the configuration of a disc recorder as an information recording/reproducing apparatus according to the present invention.

FIG. 3 is a block diagram illustrating the configuration of a disc recorder as an information recording/reproducing apparatus according to the present invention.

Figure 1:
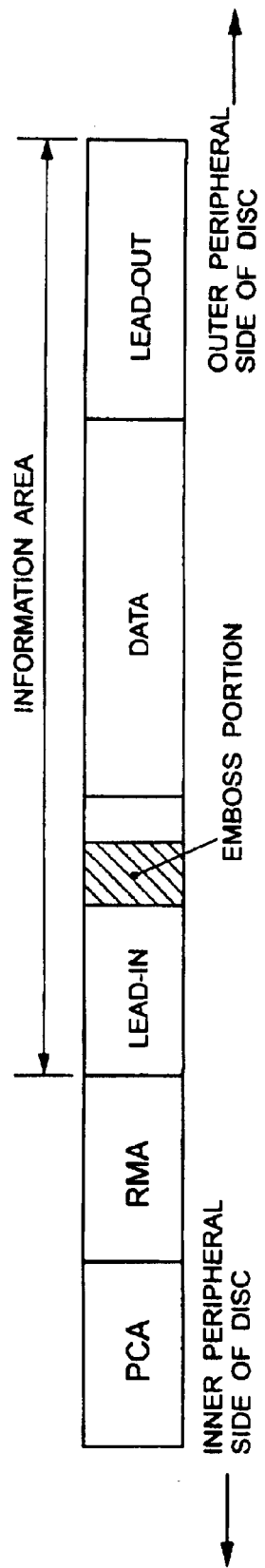
FIGS. 1 and 2 are diagrams showing the data structure and the configuration on a recording surface of a recording disc on which information data can be written.
Figure 2:
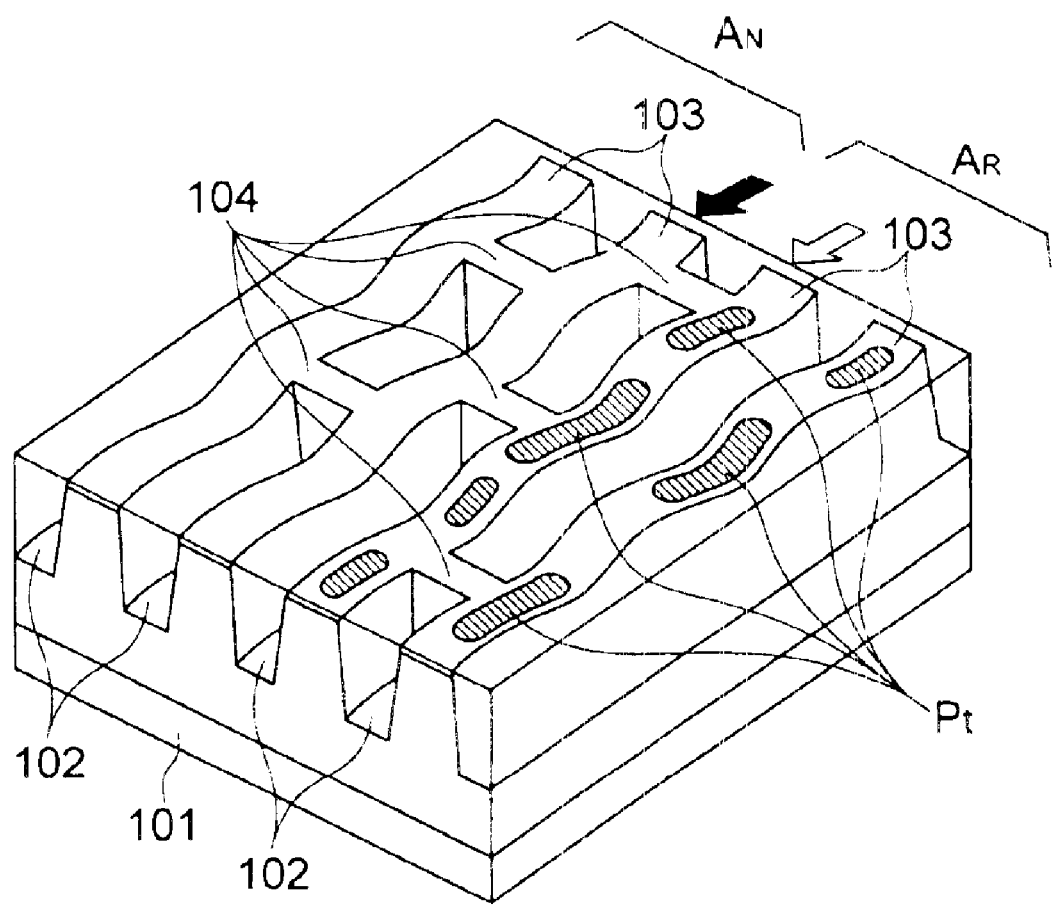

In FIG. 3, a recording signal processing circuit 1 performs desired recording modulation processing on Information data, which is to be recorded, to produce a modulated recording signal RM which is supplied to a recording/reproducing head 2 in response to a variety of recording instruction signals supplied from a system control circuit 100. The recording/reproducing head 2 irradiates a recording surface of a writable recording disc such as CD-R, CD-RW, DVD-R, or DVD-RW with a writing light beam in accordance with the modulated recording signal RM. Here, the description is made on a DVD-RW taken as representative of the recording disc 3. As illustrated in FIG. 2, the recording disc 3 is spirally or concentrically formed on a recording surface thereof alternately with groove tracks 103 and land tracks 102. Further, physical addresses on the recording disc 3 and a plurality of LPPs (land prepits) 104 are formed between mutually adjacent groove tracks 103. The LPPs 104 are previously formed on the land tracks 102 at locations at which synchronization timings are established, and at locations at which pre-data are carried.

Figure 4:
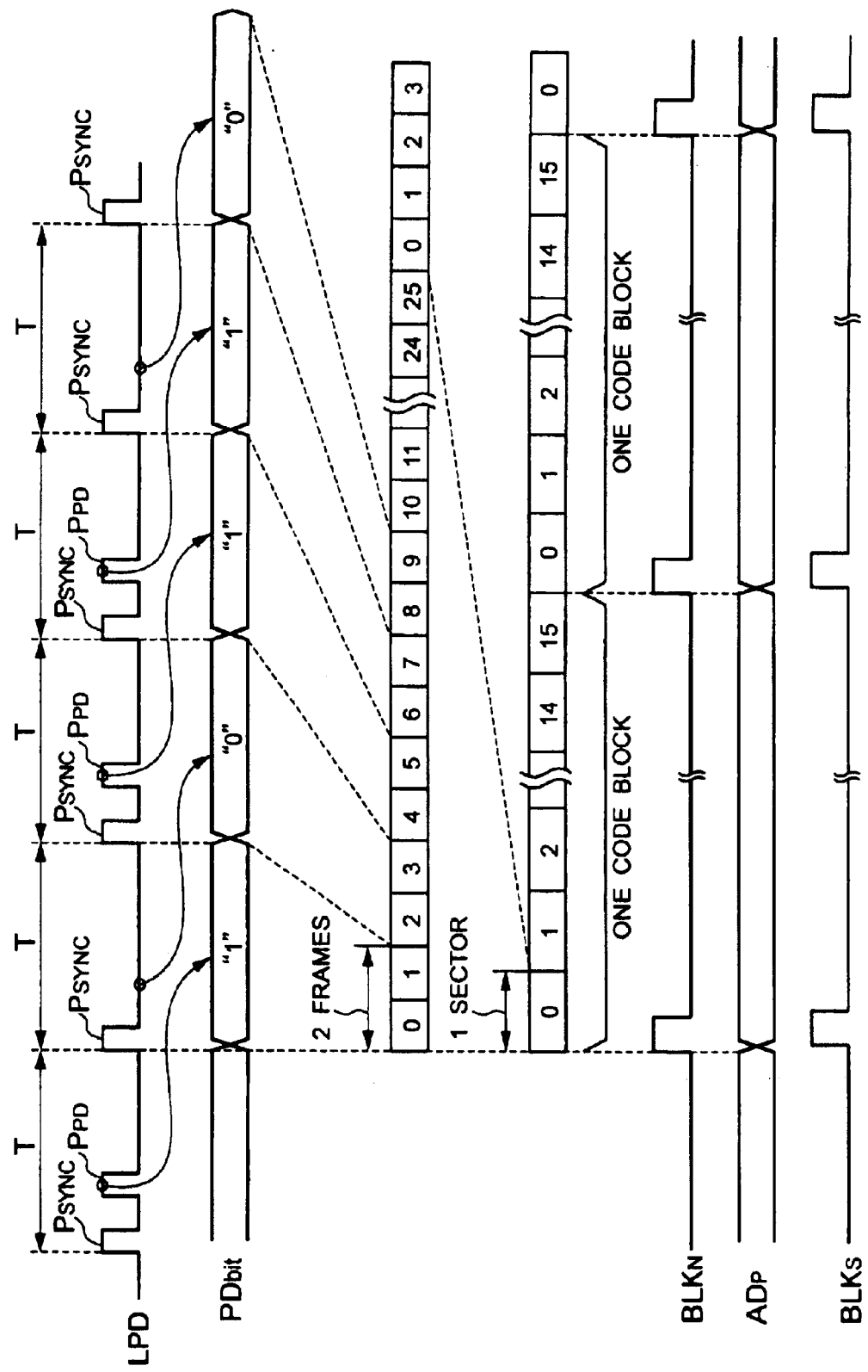
FIG. 4 is a diagram showing waveforms associated with the operation of a pre-address detector circuit 22 and a recording timing detector circuit 23.

Here, as a writing light beam is irradiated to the recording surface of the recording disc 3 as described above, information pits Pt corresponding to the modulated recording signal RM are formed on the groove tracks 103 as illustrated in FIG. 2. One code block of the modulated recording signal RM is recorded in 16 sectors on the recording disc 3 as shown in FIG. 4. In this event, one sector is comprised of 26 frames as shown in FIG. 4.

A recording/reproducing head 2 receives reflected light when a reading light beam is irradiated on a groove track 103 formed on the recording surface of the recording disc 3, photoelectrically transduces the reflected light into a read signal RS which is output. A slider unit 4 moves the recording/reproducing head 2 in a radial direction of the recording disc 3. An information data reproducing circuit 5 binarizes the read signal RS, and performs desired demodulation processing on the binarized signal to reproduce information data which is output as reproduced information data. An information data address extracting circuit 6 extracts the address of the reproduced information data generated in the information data reproducing circuit 5 based on the read signal RS, and supplies the address to a system control circuit 100 as information data address $AD_1$. An error generator circuit 7 generates a focus error signal FE based on the read signal RS for adjusting the focal points of the writing and reading light beams irradiated by the recording/reproducing head 2 to the recording surface of the recording disc 3, and supplies the focus error signal FE to a servo control circuit 8. The error generator circuit 7 further generates a tracking error signal TE based on the read signal RS for tracking the light beam on the groove track 103 on the recording disc 3, and supplies the tracking error signal TE to the servo control circuit 8. The servo control circuit 8 generates a focusing drive signal FD in accordance with the focus error signal FE, and supplies the focusing drive signal FD to the recording/reproducing head 2 through a driver 9. In this way, a focusing actuator (not shown) equipped in the recording/reproducing head 2 adjusts the focal points of the writing and reading light beams by a portion corresponding to the focusing drive signal FD. The servo control circuit 8 also generates a tracking drive signal TD based on the tracking error signal TE, and supplies the tracking drive signal TD to the recording/reproducing head 2 through a driver 10. In this way, a tracking actuator (not shown) equipped in the recording/reproducing head 2 offsets a position irradiated with the reading and writing light beams by a portion corresponding to a drive current generated by the tracking drive signal TD in the radial direction of the recording disc 3. The servo control circuit 8 further generates a slider drive signal SD in accordance with the tracking error signal TE, and supplies the slider drive signal SD to the slider unit 4 through a driver 11. In this way, the slider unit 4 moves the recording/reproducing head 2 in accordance with the slider drive signal SD in the radial direction of the disc.

An LPP (land prepit) detector circuit 12 generates an LPP detection signal LPD which exhibits a pulsatile change in level as shown in FIG. 4 each time it detects a signal in response to the LPPs 104, as illustrated in FIG. 2, read from the read signal RS. In this event, when the LPPs 104 as illustrated in FIG. 2 are normally read by the recording/reproducing head 2, the LPP detection signal LPD includes periodic pulses $P_{SYNC}$ which appear at a period T as shown in FIG. 4, and pre-data pulses $P_{DP}$ which carry pre-data.

An LPP (land prepit) defect determining circuit 21 determines whether or not the periodic pulses $P_{SYNC}$ as shown in FIG. 4 appear at the period T in the LPP detection signal LPD to determine defectively read LPPs 104 as illustrated in FIG. 2. Specifically, the LPP defect determining circuit 21 supplies the system control circuit 100 with a defect determination signal ER at logical level "0" indicative of non-defective when the periodic pulses $P_{SYNC}$ appear at the period T in the LPP detection signal LPD. On the other hand, when the periodic pulses $P_{SYNC}$ do not appear at the period T in the LPP detection signal LPD, an LPP detection defect determining circuit 208 supplies the system control circuit 100 with the defect determination signal ER at logical level "1" indicative of defective. In other words, when the recording/reproducing head 2 fails to correctly read the LPP 104 as illustrated in FIG. 2, the period of the synchronization pulses $P_{SYNC}$ in the LPP detection signal LPD does not match the period T, so that the LPP defect determining circuit 21 determines this state as defective.

Alternatively, the following approach may be employed as the defective read determining approach.

The pre-data pulses $P_{PD}$ included in the LPP detection signal LPD as shown in FIG. 4 are decoded to produce a sector address. The sector address takes a value from "0" to "15" which is incremented every sector as shown in FIG. 4. A defectively read LPP can be determined by determining whether or not the sector address is regularly generated. While the sector address can be decoded even if all LPPs cannot read, a predetermined amount of correctly read LPP is required. Therefore, the correctly read sector address indicates that the LPPs are being satisfactorily read to a certain degree or more. The defective read determination based on the sector address can be implemented in a similar configuration to an address decoder 201 and a block signal generator circuit 202, later described. In this event, the block generator circuit senses whether or not sector addresses are regularly read, and outputs a logical level "0" indicative of non-defective as the defect determination signal ER, when the sector addresses are regularly read. On the other hand, when the sector addresses are not regularly read, the block generator circuit outputs the defect determination signal ER at logical level "1" indicative of defective.

A pre-address detector circuit 22 detects a pre-address, which has been previously set on the recording disc 3, based on the LPP detection signal LPD, and supplies the system control circuit 100 with the detected pre-address as a pre-address $AD_P$.

A recording timing detector circuit 23 generates a timing signal indicative of a position at which each code block exists in a modulated recording signal RM, based on the LPP detection signal LPD, and supplies the system control circuit 100 with the timing signal as a block signal BLK.

Figure 5:
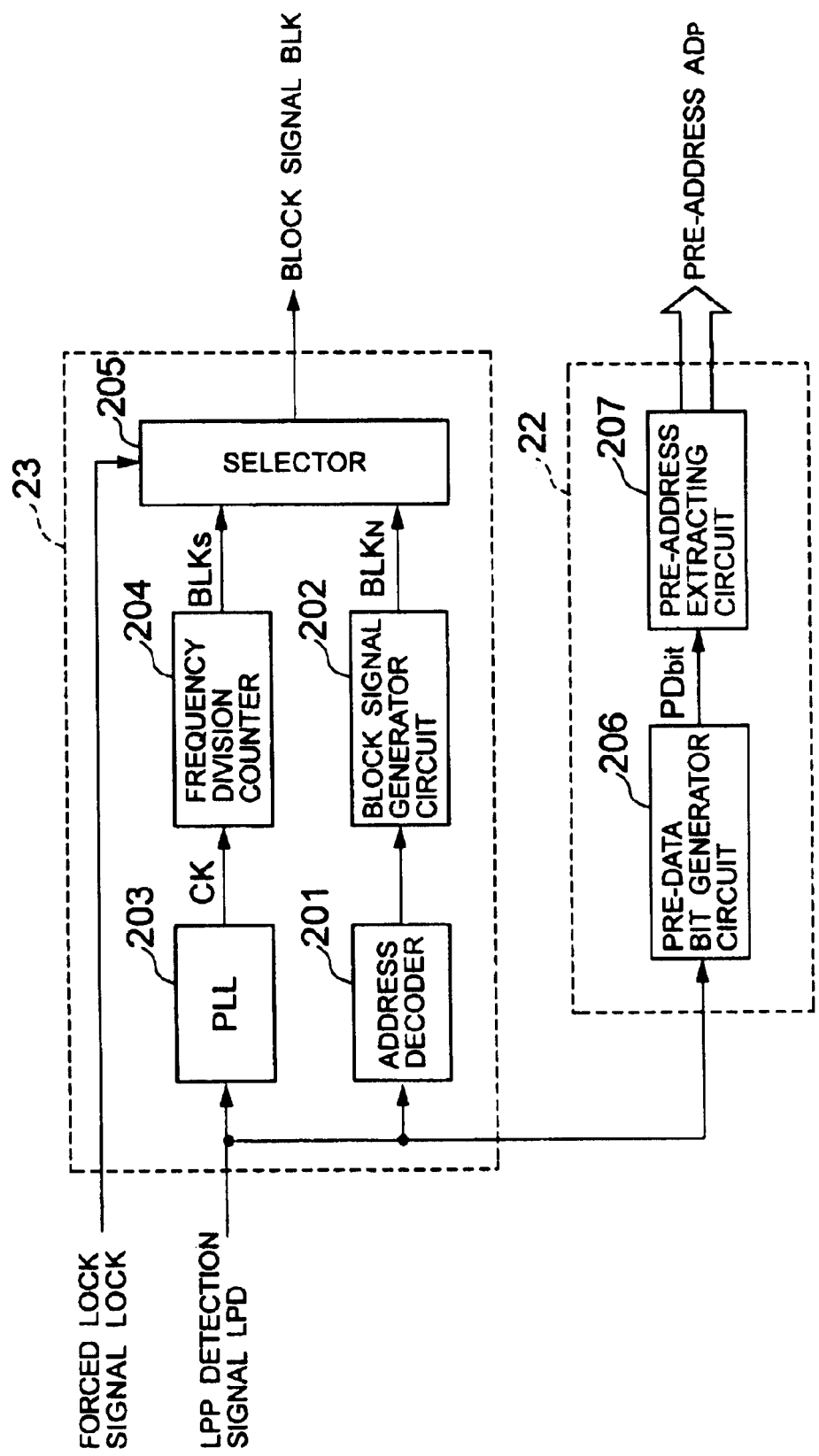
FIG. 5 is a block diagram illustrating the internal configuration of the pre-address detector circuit 22 and recording timing detector circuit 23.

FIG. 5 Is a block diagram illustrating the internal configuration of the pre-address detector circuit 22 and recording timing detector circuit 23.

In FIG. 5, an address decoder 201 decodes a pre-data pulse $P_{PD}$ included in an LPP detection signal LPD as shown in FIG. 4 to generate a sector address. The sector address takes a value from "0" to "15" which is incremented every sector, as shown in FIG. 4.

A block signal generator circuit 202 confirms whether or not the sector address regularly increments by one in the range of "0" to "15," and outputs a block signal $BLK_N$ at a timing of sector address "0" when the sector address regularly increments. Therefore, the block signal $BLK_N$ generates a pulsatile change in level at the timing synchronized in phase to each code block in the modulated recording signal RM, as shown in FIG. 4. A PLL (phase locked loop) circuit 203 is supplied with a reference clock signal, which has a sufficiently short period as compared with the synchronization pulse $P_{SYNC}$, by a clock generator circuit, not shown. The PLL circuit 203 synchronizes the reference clock signal to the synchronization pulse $P_{SYNC}$ in the LPP detection signal LPD as shown in FIG. 4 to generate a clock pulse signal CK which is supplied to a frequency division counter 204. The frequency division counter 204 counts the number of clock pulses in the clock pulse signal CK, and generates an auxiliary block signal $BLK_S$, in which pulses appear as shown in FIG. 4, each time the total number of counted clock pulses reaches a predetermined number. In other words, the frequency division counter 204 generates the clock pulse signal CK, which is generated by dividing the clock pulse signal by a predetermined number, as the auxiliary block signal $BLK_S$. In this way, even if the LPP 104 is difficult to read and therefore the synchronization pulses $P_{SYNC}$ sometimes drop, PLL works well, so that the auxiliary block signal $BLK_S$ can be output every code block, as shown in FIG. 4. In this event, the auxiliary block signal $BLK_S$ has the same period as the period of one code block of the modulated recording signal RM, as shown in FIG. 4.

The PLL circuit 203 synchronizes the phase based on the detection of the LPPs 104 to generate the clock pulse CK. Alternatively, the recording track meanders at a predetermined period as illustrated in FIG. 2, so that the clock pulse signal CK may be generated by synchronizing the phase based on a wobble signal generated by detecting the meandering pattern and then synchronizing the phase based on the LPPS. Since the wobble signal has a shorter period than the LPPS, the PLL can be accurately applied as compared with the LPP, even if some information drops. Additionally, the accuracy can be improved by applying the PLL in two stages. A selector 205 selects the block signal $BLK_N$ from the block signal $BLK_N$ and auxiliary block signal $BLK_S$ when it is supplied with a forced lock signal LOCK at logical level "0" from the system control circuit 100, and supplies the selected one to the system control circuit 100 as the final block signal BLK. On the other hand, when the forced lock signal LOCK is at logical level "1" indicative of a forced lock instruction, the selector 205 selects the auxiliary block signal $BLK_S$ which is supplied to the system control circuit 100 as the block signal BLK. In other words, the selector 205 normally outputs the block signal $Blk_N$ which is generated based on the synchronization pulse $P_{SYNC}$ existing in the LPP detection signal LPD as shown in FIG. 4 as the block signal BLK indicative of a recording timing. However, when the selector 205 is supplied with the forced lock instruction from the system control circuit 100, the selector 205 outputs the auxiliary block signal $BLK_S$ generated in a self-oscillation circuit comprised of the PLL circuit 203 and frequency division counter 204 as the block signal BLK indicative of a recording timing.

A pre-data bit generator circuit 206 generates a pre-data bit $PD_{bit}$ which is at logical level "1" when a pre-data pulse $P_{PD}$ as shown in FIG. 4 exists immediately after a synchronization pulse $P_{SYNC}$ included in an LPP detection signal LPD, and at logical level "0" when no such pre-data pulse $P_{PD}$ exists, and supplies the pre-data bit $PD_{bit}$ to a pre-address extracting circuit 207. The pre-address extracting circuit 207 retrieves every one code block of the pre-data bits $PD_{bit}$, i.e., every 208 bits, extracts predetermined 24 bits within the sequence of bits, and supplies the extracted 24 bits to the system control circuit 100 as a pre-address $AD_P$.

For additionally writing information data on the recording disc 3, the system control circuit 100 moves the recording/reproducing head 2 at a position predetermined tracks, for example, ten code blocks before a recording start location within an unrecorded region $A_N$ of the recording disc 3 as illustrated in FIG. 2, and supplies the servo control circuit 8 with an instruction signal for starting a read operation from that position. In response to the instruction, the recording/reproducing head 2 first starts reading information within the unrecorded region $A_N$. In this event, in a read signal RS output from the recording/reproducing head 2, pulses appear in response to read LPP 104.

Figure 6:
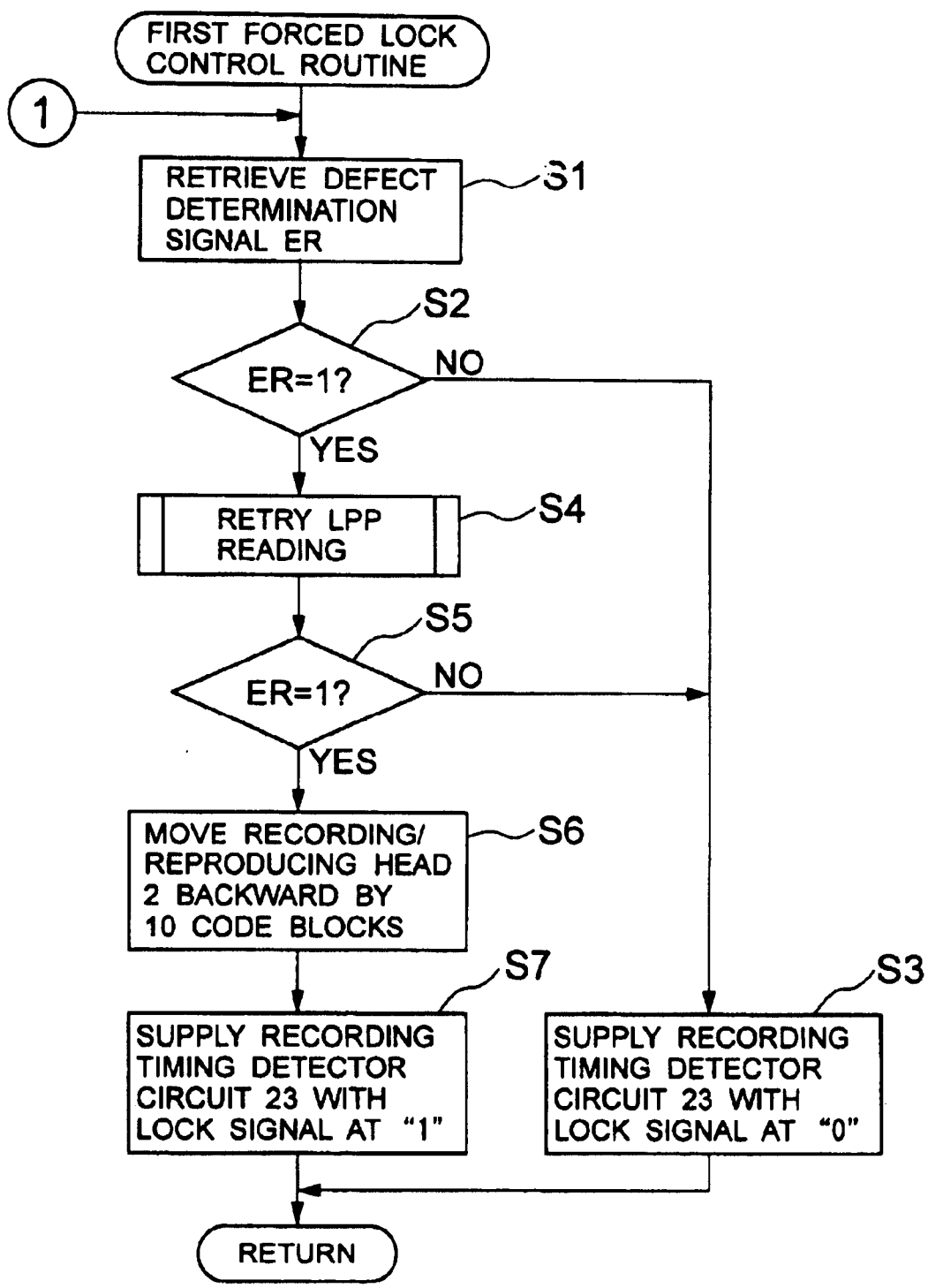
FIG. 6 is a flow chart illustrating a first forced lock control routine.

Here, the system control circuit 100 proceeds to the execution of a first forced lock control routine as illustrated in FIG. 6.

In FIG. 6, the system control circuit 100 first retrieves a defect determination signal ER supplied from the LPP defect determining circuit 21 (step S1). Next, the system control circuit 100 determines whether or not the defect determination signal ER is at logical level "1" indicative of defectively read LPPs (step S2). If the system control circuit 100 determines at step S2 that the defect determining signal ER is not at logical level "1", i.e., determines that the LPPs are being normally read, the system control circuit 100 supplies the recording timing detector circuit 23 with a forced lock signal LOCK at logical level "0" (step S3). In response to the forced lock signal LOCK at logical level "0" supplied thereto, the recording timing detector circuit 23 sends a block signal $BLK_N$ generated based on a synchronization pulse $P_{SYNC}$, which exists in an LPP detection signal LPD, to the system control circuit 100 as a block signal BLK.

On the other hand, if the system control circuit 100 determines at step S2 that the defect determination signal ER is at logical level "1" indicative of defectively read LPPs, the system control circuit 100 proceeds to the execution of an LPP read retry processing subroutine (step S4).

In the LPP read retry processing subroutine, the system control circuit 100 moves the recording/reproducing head 2 backward by 10 code blocks from a desired recording start position, and again reads the LPPs 104 in a manner similar to the aforementioned operation to determine the reading state. In other words, the system control circuit 100 retrieves the defect determination signal ER supplied from the LPP defect determining circuit 21 (step S4). Next, the system control circuit 100 determines whether or not the defect determination signal ER is at logical level "1," i.e., whether or not the LPPs are defectively read (step S5). If the system control circuit 100 determines at step S5 that the defect determination signal ER is at logical level "0," i.e., determines that the LPPs are normally read, the system control circuit 100 proceeds to the execution of the aforementioned step S3. On the other hand, if the system control circuit determines that the defect determination signal ER is at logical level "1," i.e., determines that the LPPs are defectively read, the system control circuit 100 supplies the slider unit 4 with a slider drive signal SD for moving the recording/reproducing head 2 backward by ten code blocks from a desired recording start position (step S6). Here, after the recording/reproducing head 2 has been moved, the system control circuit 100 again starts reading the LPP 104 from that position, and supplies the recording timing detector circuit 23 with the forced lock signal LOCK at logical level "1" (step S7). In response to the forced lock signal LOCK at logical level "1" supplied thereto, the recording timing detector circuit 23 sends an auxiliary block signal $BLK_S$, generated in the self-oscillation circuit comprised of the PLL circuit 203 and frequency division counter 204, to the system control circuit 100 as the block signal BLK. Stated another way, in this event, the system control circuit 100 is supplied with the auxiliary block signal $BLK_S$ with a fixed phase as a block signal indicative of a recording timing.

After executing the foregoing step S3 or S8, the system control circuit 100 exits the first forced lock control routine, and proceeds to the execution of a recording control routine. In the execution of he recording control routine, the system control circuit 100 supplies the recording signal processing circuit 1 with a recording instruction signal for recording a modulated recording signal RM at a position on the recording disc 3 indicated by the pre-address $AD_P$ at the recording timing of the block signal BLK supplied from the recording timing detector circuit 23. In this way, information pits Pt according to the modulated recording signal RM are recorded on a groove track 103 on the recording disc 3. In this recording operation, the first forced lock control routine as illustrated in FIG. 6 is also executed repeatedly at predetermined intervals.

Thus, according to the execution of the first forced lock control routine, even if the LPPs 104 are defectively read during the recording operation so that the block signal $BLK_N$ is not detected based on the LPP detection signal LPD, the recording timing can be provided by the auxiliary block signal $BLK_S$ in place of the block signal $BLK_N$.

While in the foregoing embodiment, the retry for the defective LPP read determination is performed only once, the retry may be performed a plurality of times. Alternatively, the routine may proceed to the processing at step S6 without executing the LPP read retry and defect determination at steps S4 and S5.

Since a DVD-RW permits information to be recorded on the outer peripheral side away from the unrecorded region on the disc, information may be recorded on the inner peripheral side of the recorded region as illustrated in FIG. 2 in some situation. As an exemplary case where a recorded region exists on the outer peripheral side of a position at which information is recorded, recording in the PCA is contemplated. The PCA, which is a area for recording a calibration signal for the recording power of the recording/reproducing head 2, is defined to be used from the outer peripheral side to the inner peripheral side of the disc for every predetermined area. In this event, since the calibration signal may be recorded with very high power in some cases, the recording/reproducing head 2 will experience difficulties in reading LPPs 104.

Thus, for additionally writing information data on the inner peripheral side of a recorded region, a forced lock is essentially applied without the defect determination at step S2.

Figure 7:
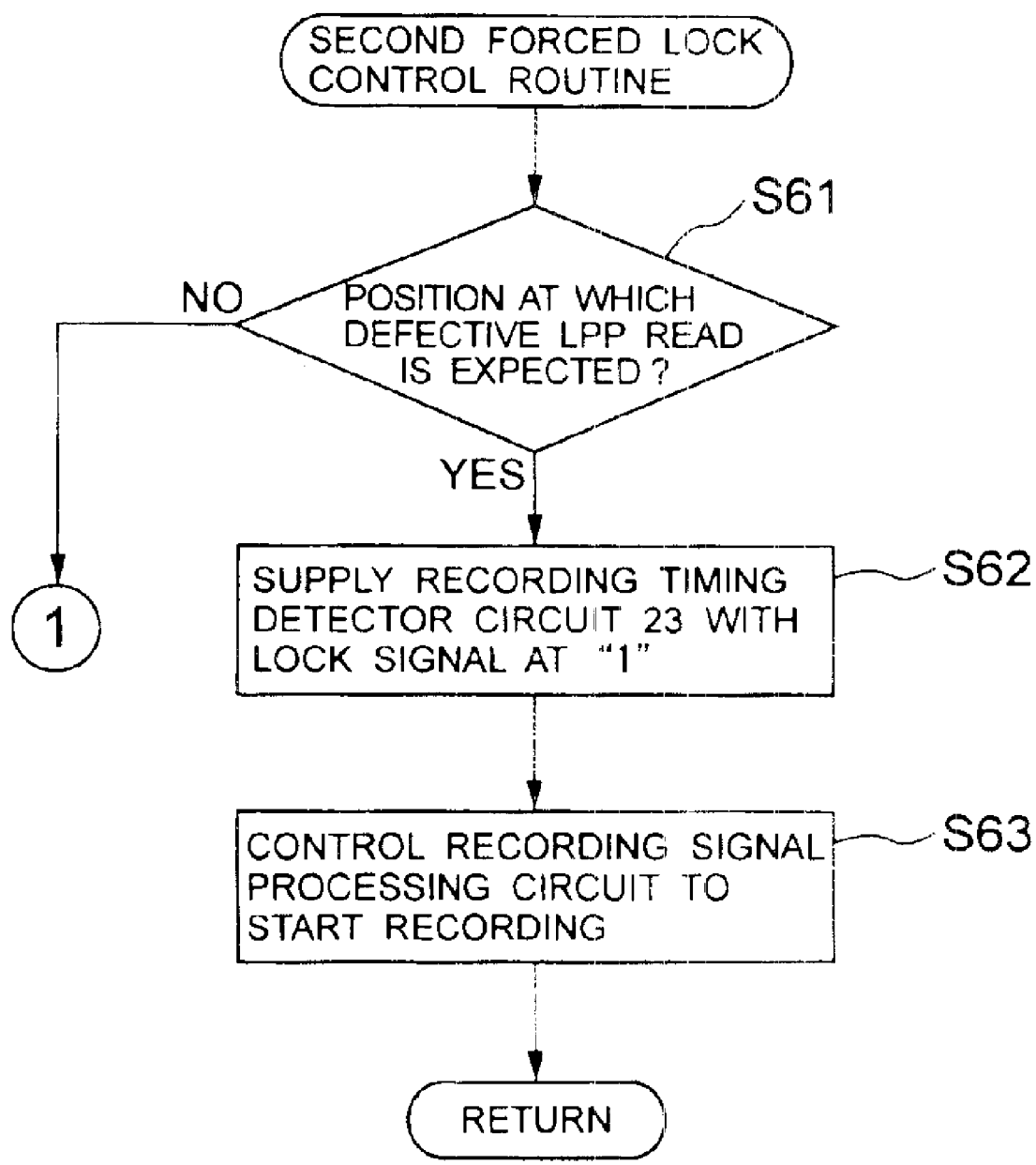
FIG. 7 is a flow chart illustrating a second forced lock control routine.

FIG. 7 is a flow chart illustrating a second forced lock control routine which is implemented in view of the foregoing aspect.

In FIG. 7, the system control circuit 100 first determines whether or not defective reading of LPPs is expected around a position at which information data is additionally written, or a region a predetermined code blocks (for example, five code blocks) before that position, i.e., whether or not a recorded region exists near that position (step S61). For making this determination, the recording/reproducing head 2 previously scans a region including the surroundings of the recording position to check whether or not a recorded region exists before starting the recording, and stores addresses indicative of the recorded region, if any, in a memory. Then, the system control circuit 100 or another microcomputer (not shown) references the contents stored in the memory to determine whether or not defective reading of LPPs is expected at the position, i.e., whether or not a recorded region exists at the position.

When determining at step S61 that a recorded region exists at the aforementioned position, the system control circuit 100 supplies the recording timing detector circuit 23 with a forced lock signal LOCK at logical level "1" (step S62). In response to the forced lock signal LOCK at logical level "1" supplied thereto, the recording timing detector circuit 23 sends an auxiliary block signal $BLK_S$ generated in the self-oscillation circuit comprised of the PLL circuit 203 and frequency division counter 204 to the system control circuit 100 as a block signal BLK. In this event, the system control circuit 100 controls the recording signal processing circuit 1 in order to start recording a modulated recording signal RM on the recording disc 3 at a recording timing based on the auxiliary block signal $BLK_S$ which has been applied with the forced lock (step S63). On the other hand, when determining at step S62 that no recorded region exists, the system control circuit 100 proceeds to the execution of the first forced lock control routine as illustrated in FIG. 6.

When calibration is performed in te PCA, a recording operation is performed in a forced lock state created at the aforementioned steps S62 and S63. Specifically, since a recorded region exists outside the PCA, the PCA satisfies the condition at step 61 in FIG. 7 of a position at which defective reading of LPPs is expected.

Also, for recording in a region adjoining the outer peripheral side of the emboss portion, recording preparation is required for tracing the emboss portion. Due to the structure of the emboss portion in which LPPs can be read but information cannot be written. LPPs in the emboss portion are more difficult to read as compared with LPPs in other unrecorded regions. For this reason, the system control circuit 100 also performs a recording operation in a forced lock state when information is recorded in such a region which requires the recording preparation for tracking the emboss portion. Specifically, since the emboss portion falls under the definition of a position at which defective reading of LPPs is expected, a recording operation is performed in the forced lock state created at the aforementioned steps S62 and S63.

While in the foregoing embodiment, the operation of the present invention has been described in connection with an information recording/reproducing apparatus, taken as an example, for recording and reproducing a DVD-RW, the present invention can be applied to a variety of information recording/reproducing apparatuses for recording and reproducing other recording media.

As described above in detail, in the present invention, when LPPs are defectively read during a recording operation, a block signal generated based on the LPPs is replaced with a block signal having the same period as this block signal but a fixed phase for use as a recording timing signal.

Therefore, according to the present invention, information data can be written into a location on a recording medium which is susceptible to defective reading of LPPs.

This application is based on Japanese Patent Application No. 2001-6971 which is hereby incorporated by reference.

What is claimed is:

1. An information recording/reproducing apparatus for recording an information signal in units of predetermined block length on a recording medium which has previously been formed with prepits associated with recording timings, said apparatus comprising:
   a reader for reading recorded information from said recording medium to generate a read signal;
   a prepit detector for detecting the prepits from the read signal to generate a prepit detection signal;
   a recording timing signal detector for detecting a block signal indicative of a recording timing for the information signal based on the prepit detection signal;
   an auxiliary recording timing signal generator for generating a pulse signal having the same period as the block length by using a reference clock signal, and outputting the pulse signal as an auxiliary block signal; and
   a recording controller for recording the information signal on said recording medium at a recording timing in accordance with the block signal when the prepit detection signal is normal, and for recording the information signal on said recording medium at a recording timing in accordance with the auxiliary block signal when the prepit detection signal is defective.

2. An information recording/reproducing apparatus for recording an information signal in units of predetermined block length on a recording medium which has previously been formed with prepits associated with recording timings, said apparatus comprising:
   a reader for reading recorded information from said recording medium to generate a read signal;
   a prepit detector for detecting the prepits from the read signal to generate a prepit detection signal;
   a recording timing signal detector for detecting a block signal indicative of a recording timing for the information signal based on the prepit detection signal;
   an auxiliary recording timing signal generator for generating a pulse signal having the same period as the block length, and outputting the pulse signal as an auxiliary block signal;
   a recording controller for recording the information signal on said recording medium at a recording timing in accordance with the block signal when the prepit detection signal is normal, and for recording the information signal on said recording medium at a recording timing in accordance with the auxiliary block signal when the prepit detection signal is defective; and
   a prepit defect determining part for determining whether or not the prepit detection signal is defective.

3. An information recording/reproducing apparatus for recording an information signal in units of predetermined block length on a recording medium which has previously been formed with prepits associated with recording timings, said apparatus comprising:
   a reader for reading recorded information from said recording medium to generate a read signal;
   a prepit detector for detecting the prepits from the read signal to generate a prepit detection signal;
   a recording timing signal detector for detecting a block signal indicative of a recording timing for the information signal based on the prepit detection signal;
   an auxiliary recording timing signal generator for generating a pulse signal having the same period as the block length, and outputting the pulse signal as an auxiliary block signal; and
   a recording controller for recording the information signal on said recording medium at a recording timing in accordance with the block signal when the prepit detection signal is normal, and for recording the information signal on said recording medium at a recording timing in accordance with the auxiliary block signal when the prepit detection signal is defective, wherein said auxiliary recording timing signal generator comprises:
   a PLL circuit for generating a clock signal at a predetermined frequency, synchronized in phase to the prepit detection signal; and
   a frequency division counter for dividing the clock signal by a predetermined number to generate a divided clock signal as the auxiliary block signal.

4. An information recording/reproducing apparatus for recording an information signal in units of predetermined block length on a recording medium which has previously been formed with prepits associated with recording timings, said apparatus comprising:
   a reader for reading recorded information from said recording medium to generate a read signal;
   a prepit detector for detecting the prepits from the read signal to generate a prepit detection signal;
   a recording timing signal detector for detecting a block signal indicative of a recording timing for the information signal based on the prepit detection signal;
   an auxiliary recording timing signal generator for generating a pulse signal having the same period as the block length, and outputting the pulse signal as an auxiliary block signal; and
   a recording controller for recording the information signal on said recording medium at a recording timing in accordance with the block signal when the prepit detection signal is normal, and for recording the information signal on said recording medium at a recording timing in accordance with the auxiliary block signal when the prepit detection signal is defective, wherein said recording controller records the information signal on said recording medium at a recording timing in accordance with the auxiliary block signal when the information signal is recorded on an unrecorded track adjacent to a recorded region on said recording medium.

5. An information recording/reproducing apparatus for recording an information signal in units of predetermined block length on a recording medium which has previously been formed with prepits associated with recording timings, said apparatus comprising:
   a reader for reading recorded information from said recording medium to generate a read signal;
   a prepit detector for detecting the prepits from the read signal to generate a prepit detection signal;
   a recording timing signal detector for detecting a block signal indicative of a recording timing for the information signal based on the prepit detection signal;
   an auxiliary recording timing signal generator for generating a pulse signal having the same period as the block length, and outputting the pulse signal as an auxiliary block signal; and
   a recording controller for recording the information signal on said recording medium at a recording timing in accordance with the block signal when the prepit detection signal is normal, and for recording the information signal on said recording medium at a recording timing in accordance with the auxiliary block signal when the prepit detection signal is defective, wherein:

said recording medium is a recording disc which is previously provided with an OPC area for performing a trial write in determining light power of a recording laser beam, and an emboss portion for recording information related to copy protection, and said recording controller records the OPC area or the emboss portion at a recording timing in accordance with the auxiliary block signal.

* * * * *